United States Patent [19]

Glynn et al.

[11] 4,442,801

[45] Apr. 17, 1984

[54] ELECTROLYSIS FUEL SUPPLEMENTATION APPARATUS FOR COMBUSTION ENGINES

[76] Inventors: John D. Glynn, One Century Plz., 2029 Century Park East, Los Angeles, Calif. 90067; Daniel R. Glynn, 2215 El Arbolito Dr., Glendale, Calif. 91208; Arthur R. Andrews, 1049 Alcalde Dr., Glendale, Calif. 91207

[21] Appl. No.: 331,246

[22] Filed: Dec. 16, 1981

[51] Int. Cl.³ ............................................. F02B 43/10
[52] U.S. Cl. .................. 123/3; 123/DIG. 12
[58] Field of Search .................. 123/1 A, 3, DIG. 12; 204/129

[56] References Cited

U.S. PATENT DOCUMENTS

| | | | |
|---|---|---|---|
| 1,333,836 | 3/1920 | Csanyl | 204/129 |
| 1,379,077 | 5/1921 | Blumberg, Jr. | 123/DIG. 12 |
| 1,876,879 | 9/1932 | Drabold | 123/527 |
| 2,006,676 | 7/1935 | Garrett | 204/5 |
| 2,509,498 | 5/1950 | Heyl | 123/525 |
| 2,937,634 | 5/1960 | Kelseaux et al. | 123/DIG. 12 |
| 3,074,390 | 1/1963 | O'Laughlin | 123/DIG. 12 |
| 3,648,668 | 3/1972 | Pacheco | 123/3 |
| 4,023,545 | 5/1977 | Mosher et al. | 123/DIG. 12 |
| 4,084,938 | 4/1978 | Willard, Sr. | 44/1 G |
| 4,124,463 | 11/1978 | Blue | 204/129 |

Primary Examiner—William A. Cuchlinski, Jr.
Attorney, Agent, or Firm—Fulwider, Patton, Rieber, Lee & Utecht

[57] ABSTRACT

A combustion engine is provided with a fuel supplementation system in which water is broken down by electrolysis into hydrogen and oxygen which are then added to the fuel delivery system. The electrolysis takes place in a chamber in which a pusher gas rises through perforated horizontal electrode plates to sweep the hydrogen and oxygen from the plates as it is generated, thereby preventing the accumulation of these gases in the chamber. In addition, the electrolyte can be circulated, passing it through a filter, to increase the turbulence and agitation within the chamber. The rate at which the water is electrolyzed is varied, as by modulating the voltage applied to the plates, in accordance with the throttle position of the engine. Since gases do not accumulate in the chamber, variations in the rate at which these gases are yielded are affected substantially instantaneously. Lignite activited water can be added to the electrolyte to inhibit the formation of sludge.

25 Claims, 5 Drawing Figures

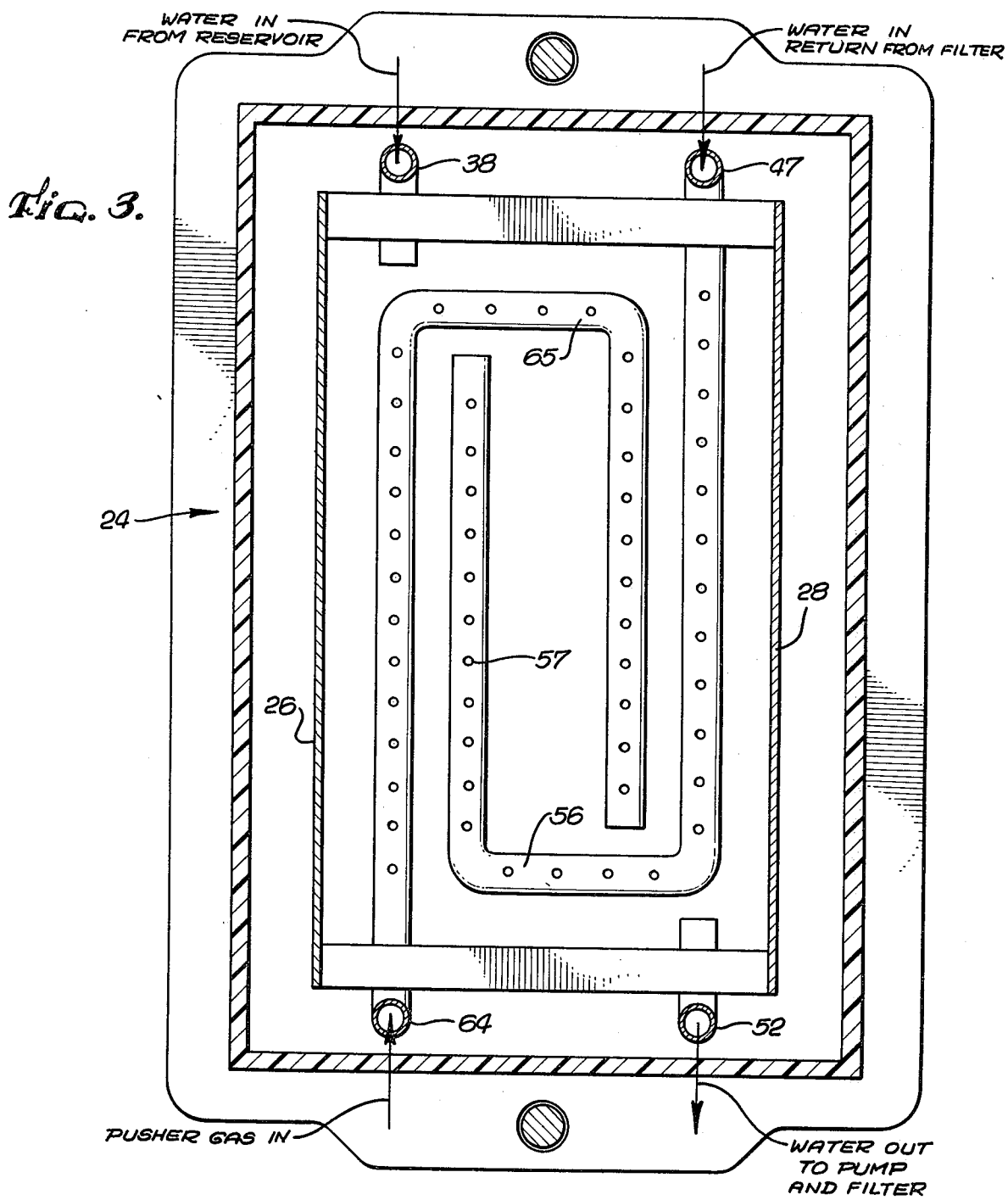
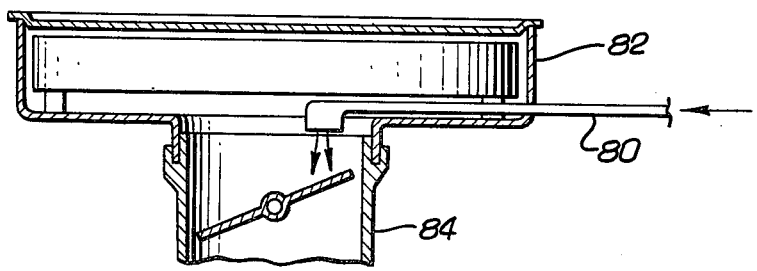

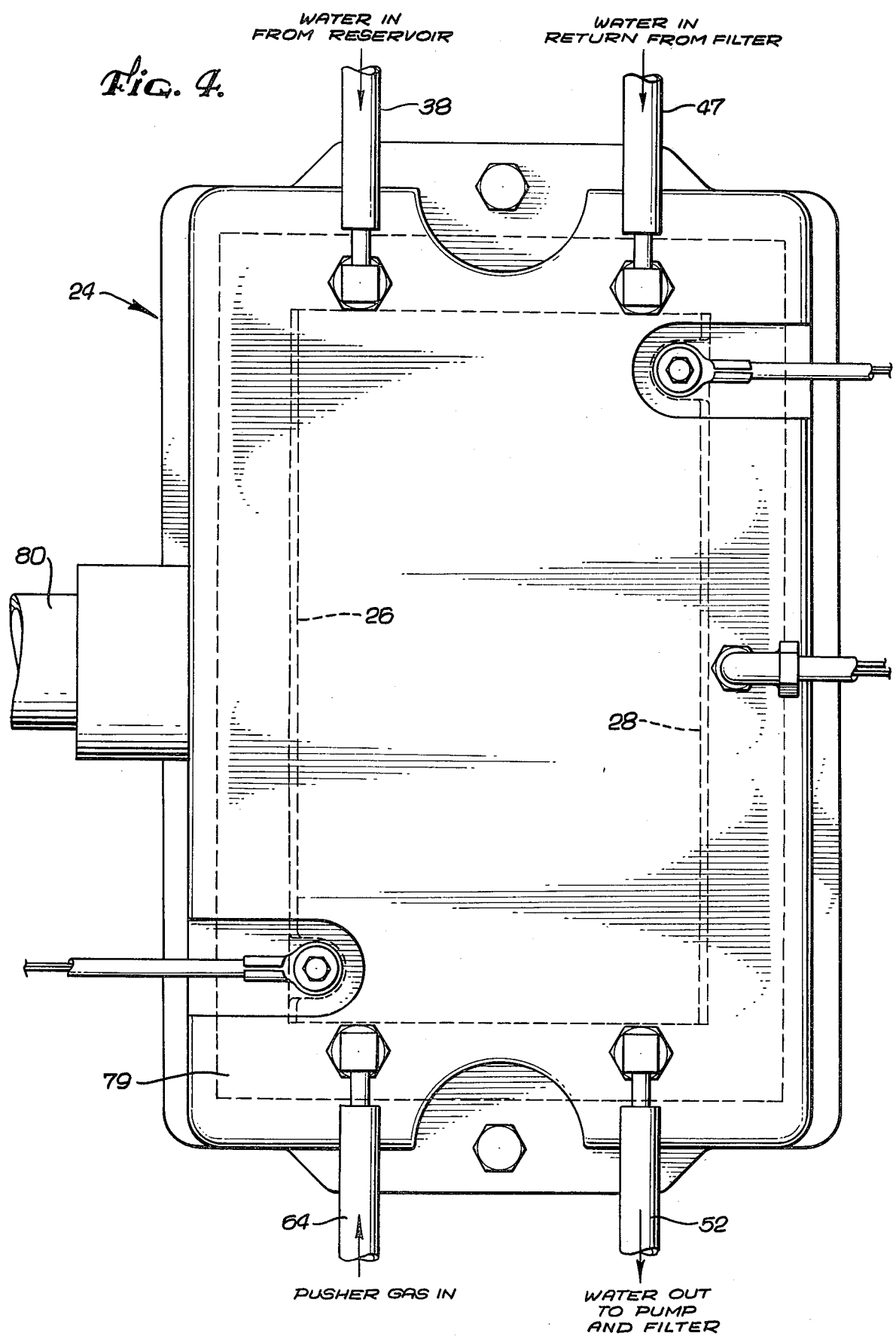

ELECTROLYSIS FUEL SUPPLEMENTATION APPARATUS FOR COMBUSTION ENGINES

FIELD OF THE INVENTION

The present invention relates to engines and, more particularly, to engines that employ a hydrogen supplemented fuel supply.

BACKGROUND OF THE INVENTION

Hydrogen has numerous important advantages as a fuel. The energy released per pound is high when compared to conventional fuels and it is clean-burning. Moreover, it can be burned in a conventional spark-ignition, internal combustion engine.

There are, however, serious drawbacks to the use of hydrogen that have prevented its adoption as a common engine fuel. Among the most important of its drawbacks is its extreme volatility, creating an ever present danger of an accidental ignition and explosion. In addition, hydrogen must be stored at high pressures in heavy gauge tanks and its pressure varies widely with changes in temperature. To reduce the pressure of stored hydrogen to a level at which it can be introduced into the fuel delivery system of an internal combustion engine generally requires an elaborate arrangement of valves and heat exchangers.

Recognizing the advantages of hydrogen as a primary fuel, particularly in the case of motor vehicle power plants, there has been some experimentation to evaluate its practical utility as a fuel supplement. It has been found that when hydrogen is mixed with gasoline and air in the combustion chamber of a spark-ignition engine, it results in improved combustion. The advantages gained are believed to result from the ability of hydrogen to sustain combustion at lean mixtures, with reduced combustion temperatures. The result is substantially improved thermal efficiency and a marked reduction of noxious emissions.

The use of hydrogen as a fuel supplement, however, presents the same difficulties as its use as a primary fuel, although on a smaller scale. It has, therefore, been proposed to generate the hydrogen at the engine by electrolysis of water. Oxygen is also yielded by the electrolysis to further enhance combustion. While this arrangement has confirmed certain theoretical advantages of hydrogen supplementation, it has, apparently, not yielded a practical, workable system, as the arrangement has been known for some time but has not come into common use.

It is believed that a principal reason for the lack of practical workability of previously known hydrogen supplementation systems is that the hydrogen and oxygen gases tend to accumulate on the surfaces of the electrode plates by which the water is broken down. The accumulated gases reduce the effectiveness of the apparatus by temporarily preventing large portions of the electrode surfaces from interacting with the electrolyte. A cyclical or erratic yield of hydrogen and oxygen may result.

Another and perhaps more important problem is that the accumulation of the hydrogen and oxygen gases in the electrolysis chamber prevents the quality of such gases produced from being responsive to the instantaneous demand. In addition, the accumulation of these highly volatile gases presents a safety hazard since the accumulated gases would be released in the event of an impact, such as a collision of a vehicle in which the system is in use.

A still further problem associated with such electrolytic hydrogen supplementation systems is that sludge tends to accumulate in the chamber. The electrode surfaces may become coated and orifices may be clogged.

An objective of the present invention is the provision of a new and improved hydrogen supplementation system that overcomes or minimizes the above-mentioned disadvantages of previously known systems.

SUMMARY OF THE INVENTION

The present invention accomplishes the above objective by the use of a fuel supplementation system in which hydrogen and oxygen are generated, on demand, in an electrolysis chamber, and these gases are constantly swept from electrode plates on which they would otherwise accumulate. Delivery of the supplement gases to the combustion chamber of the engine is substantially instantaneous. The rate at which hydrogen and oxygen are generated is varied in response to the engine throttle setting, as by modulating the voltage applied to the electode plates. Preferably, the electrode plates are horizontal and perforated, the plates of one electrode being interleaved with those of the opposite electrode. A pusher gas may be introduced at the bottom of the electrolysis chamber to sweep the plates, this gas being distributed along the bottom of the chamber by a perforated pusher gas manifold. The pusher gas can advantageously be a portion of the engine exhaust that is to be recirculated.

Sweeping of the electrode plates can also be affected by circulating the electrolyte, which can be passed through a filter as it circulates. The electrolyte can be returned to the electrolysis chamber by a perforated circulation manifold that can be internested with the pusher gas manifold along the bottom of the chamber.

The fuel supplement gases are supplied to the air/fuel intake of the carburetor or other fuel delivery means of the engine. Any gases not drawn into the engine are allowed to escape and dissipate into the atmosphere.

The electrode surfaces can be kept clean and the performance of the device enhanced by the addition of lignite activited water to the electrolyte. A reservoir is provided from which the electrolyte is supplied to the chamber in response to a signal indicating a reduction in the electrolyte level.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 3 is a cross-sectional top view of the electrolysis chamber taken along the line 3—3 of FIG. 2;

FIG. 4 is a top view of the electrolysis chamber; and

FIG. 5 shows the input of the fuel supplement to the carburetor of the engine.

DESCRIPTION OF THE PREFERRED EMBODIMENT

Figure 1:
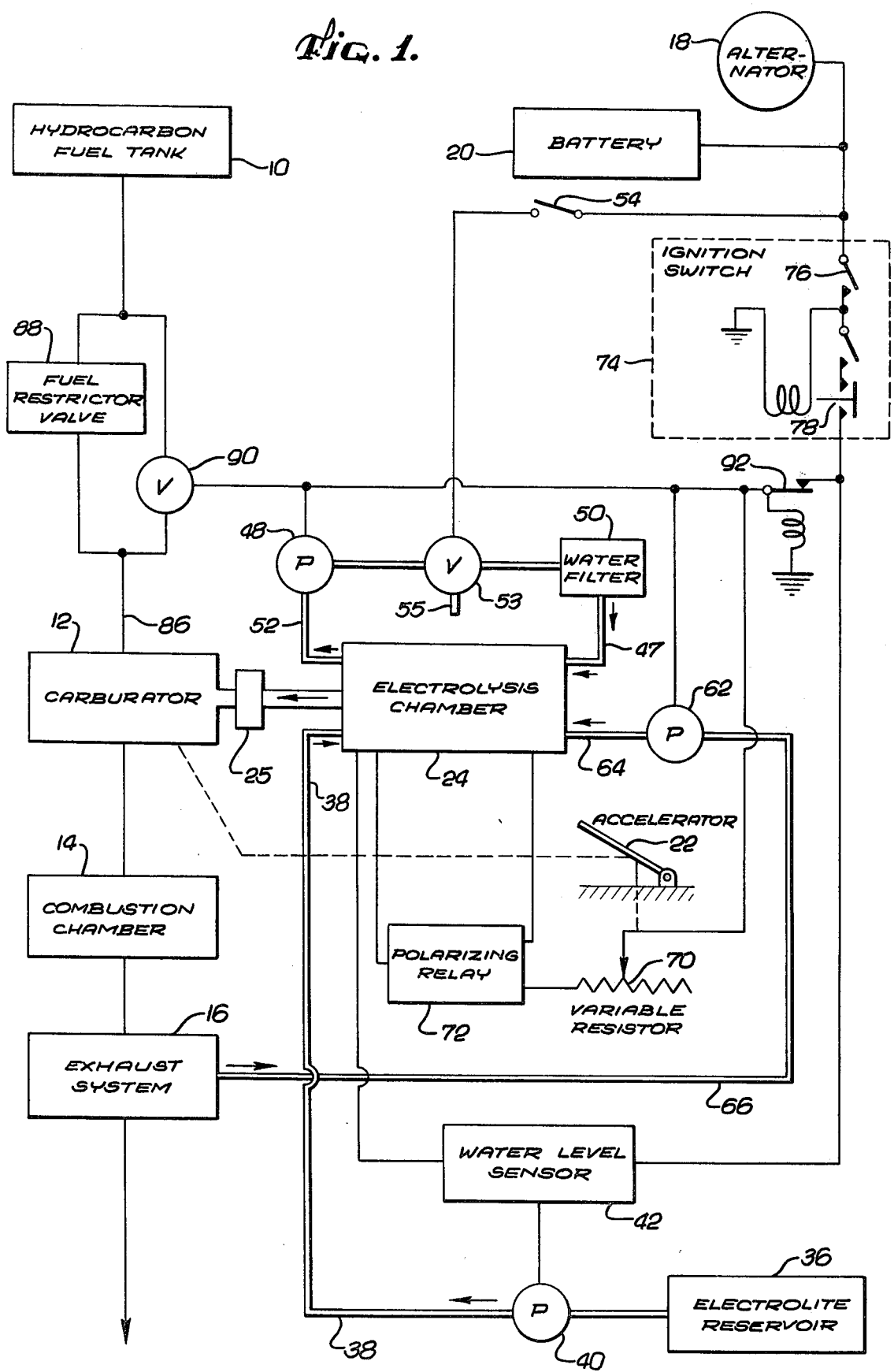
FIG. 1 is a schematic illustration of an internal combustion engine that includes a fuel supplementation apparatus constructed in accordance with the present invention.

The invention will be explained with reference to an exemplary embodiment, shown in FIGS. 1 through 5, that is applied to a conventional spark-ignition, internal combustion engine of the reciprocating type. It is assumed that fuel, preferably gasoline from a hydrocarbon fuel tank 10 is supplied to a conventional carburetor 12 where it is mixed with ambient air and delivered to one or more combustion chambers 14. Exhaust gases exit from the engine through an exhaust system 16. The above engine components are shown schematically in FIG. 1.

The mechanical power output of the engine drives an electrical alternator 18 which charges a battery 20 and energizes the ignition system (not shown) of the engine. A throttle 22 is connected to the carburetor 12 to control the speed of the engine in the conventional manner.

Figure 2:
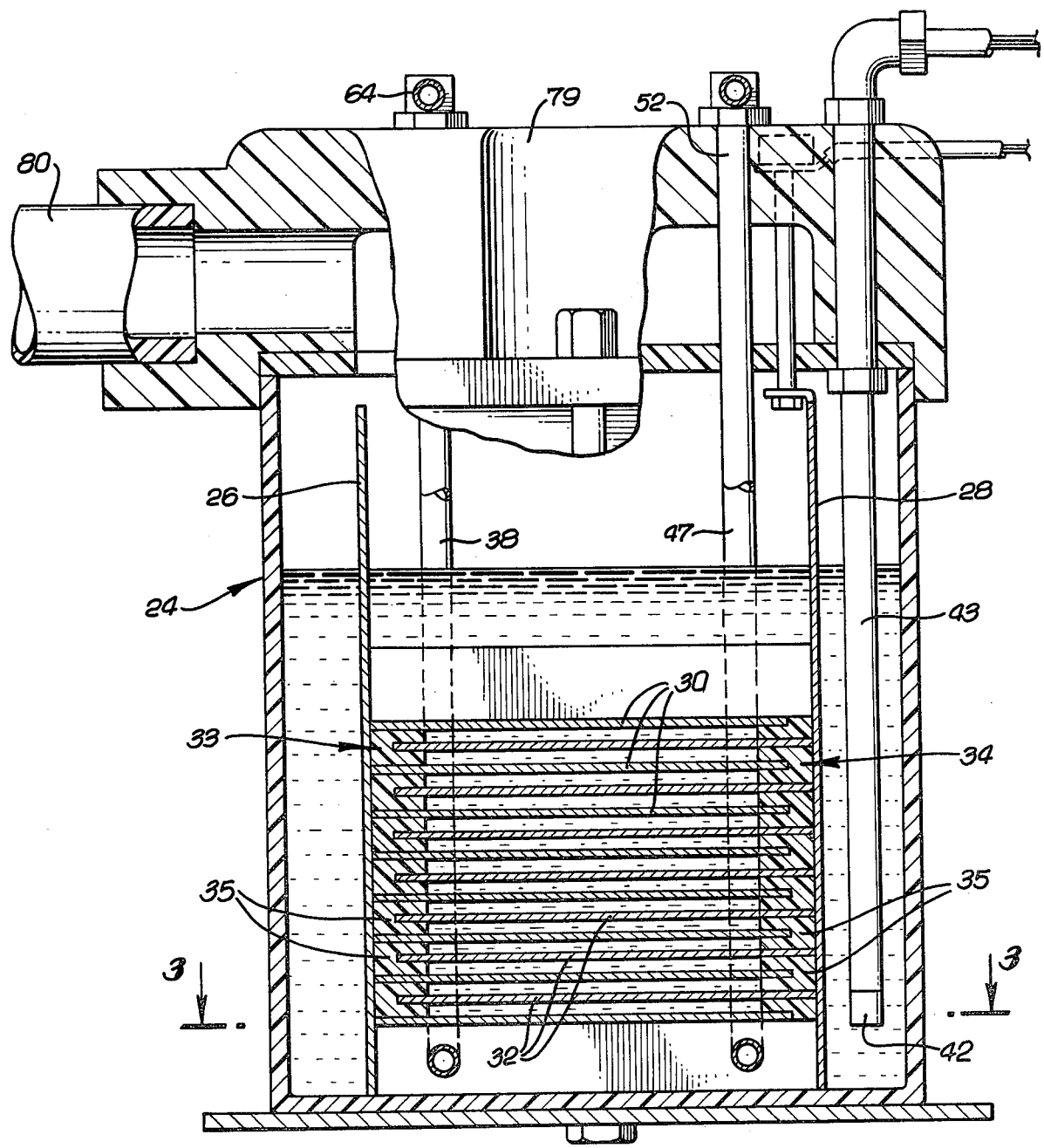
FIG. 2 is a cross-sectional end view of an electrolysis chamber of the apparatus of FIG. 1.

Performance and efficiency of the engine are improved substantially by the addition of a fuel supplementation apparatus, the heart of which is an electrolysis chamber 24, as shown in greater detail in FIGS. 2, 3 and 4. In this chamber 24, hydrogen and oxygen are generated by the electrolysis of water for addition to the fuel introduced through a fire brake 25 to the engine combustion chambers 14.

The electrolysis chamber 24 is formed by a waterproof, generally box-like, seamless casing made of a chemically and electrically inert material such as tempered glass, high density and high impact plastic, a glazed ceramic or a lava product. As best shown in FIG. 2, two oppositely charged, imperforate, rectangular electrode members 26 and 28 are vertically disposed along opposite sides of the chamber 24. A first set of horizontal, rectangular electrode plates 30 extends from the first vertical electrode member 26 toward the second electrode member 28. These plates 30 are in electrical contact with the first vertical member 26 but are not in electrical contact with the second vertical member 28. A second set of similar plates 32 extends horizontally from the second vertical electrode member 28 toward the first member 26 and are in electrical contact with the second member but not the first.

The plates 30 and 32 of the first and second sets are interleaved. Thus, the first vertical electrode member 26 and the first set of plates 30 combine to form a single electrode 33 of one polarity while the second vertical electrode member 28 and the second set of plates 32 combine to form a second electrode 34 of the opposite polarity.

The electrode plates 30 and 32 are perforated to permit an electrolyte to flow through and between them with the holes of successive plates being non-aligned to promote agitation of the electrolyte as it flows and to enhance lateral electrolyte flow. A preferred electrode material is stainless steel of the 300 series. It has been found advantageous to use perforations of 5/32 of an inch at a density of 33 per square inch, which results in the removal of 63 percent of the plate material, although it will be appreciated that other configurations are suitable.

It is important to maintain the spacing between the electrode plates 30 and 32 and to prevent oppositely charged adjacent plates from contacting each other. For this reason, spacers 35 are inserted between adjacent plates 30 and 32 along the two vertical electrode members 26 and 28. Each spacer 35 is an elongated rectangular strip. It must be made of a non-conductive material and must withstand chemical attack at elevated temperatures by the electrolyte and the gases present in the chamber 24. Many materials commonly used as spacers in batteries are not satisfactory. Thus, oak and even cetain ceramics are to be avoided. Glass is preferred.

The electrolyte is supplied to the electrolysis chamber 24 from a remote electrolyte reservoir 36 (FIG. 1) through a fill pipe 38. Water possessing sufficient impurities to promote ionization is a suitable electrolyte. In most cases ordinary tap water will do. However, superior performance is obtained by the use of an electrolyte additive known as catalyst altered water or lignite activated water. The additive contains sodium, potassium, silicates and the aqueous solution lignite, described in U.S. Pat. Nos. 3,893,943 and 4,084,938 to Willard. It is beneficial because it inhibits the formation of sludge in the chamber 24 and prevents the apparatus from becoming clogged.

The electrolyte is pumped from the reservoir 36 by a supply pump 40 that is electrically actuated by an electrolyte level sensor 42 in the chamber 24. The sensor 42 takes the form of a pressure responsive switch mounted on the bottom end of a rod 43 positioned vertically within the chamber 24 (FIG. 2). Thus, as the electrolyte in the electrolysis chamber 24 is consumed, it is always maintained at such a level that the electrode plates 30 and 32 are fully submerged.

The electrolyte is continuously withdrawn from the bottom of the chamber 24 through a tube 47 (shown in FIGS. 2 and 3) by a circulation pump 48 and returned through a filter 50 to a tube 52 that likewise lies at the bottom of the chamber. The filter 50 prevents the buildup of sludge that tends to collect in the electrolysis chamber 24, coating the electrodes 33 and 34 and reducing the efficiency of the apparatus. Ideally, the filter 50 should remove rust particles but allow rust to remain in solution in the electrolyte to serve as a conductor. A 10–50 micron filter is desirable, with a 10 micron filter being preferred.

As the electrolyte flows from the circulation pump 48 to the chamber 24, it passes through a valve 53 which normally occupies a flow-through position. The valve 53 can, however, be repositioned, by closing an electrically operated switch 54, causing the output of the pump 48 to be diverted to an outlet 55 instead of reaching the chamber 24 (FIG. 1). Thus, the circulation pump 48 can be used to empty the electrolysis chamber 24, which is desirable if the electrolyte becomes contaminated or if the temperature is expected to drop below freezing.

When the pump 48 is operating, with the valve 53 closed, a constant circulation of the electrolyte is maintained to inhibit the accumulation of hydrogen-oxygen gas on the surfaces of the plates 30 and 32 that would occur if the electrolyte were relatively static. The accumulation of these gases would shield portions of the plate surfaces from the electrolyte and effectively prevent those portions from engaging in the electrolysis process, thus reducing the quantity of hydrogen produced.

It is important to promote substantially uniform agitation of the electrolyte throughout the electrolysis chamber 24. A circulation manifold portion 56 of the tube 52 within the chamber 24, therefore, extends horizontally first lengthwise along the chamber, then along the opposite end of the chamber and finally back toward the first end, thus being generally U-shaped (see FIG. 3). Perforations 57 along the top surface of the manifold 56 permit the returning electrolyte to escape from this closed-end structure as it flows in an upward direction.

Horizontal disposition of the electrode plates 30 and 32 is desirable in part because it promotes the greatest agitation of the plate surfaces due to the circulating electrolyte. However, the presence of downwardly facing electrode surfaces also tends to have the effect of holding the buoyant hydrogen and oxygen bubbles as they form. It is, therefore, beneficial to the performance of the hydrogen generation system to provide for greater turbulence within the chamber 24. Increased agitation is provided by a pusher gas pump 62 by which a pusher gas is forced through a line 64 under pressure to the bottom of the chamber 24 so that the gas rising up through the chamber will dislodge hydrogen-oxygen bubbles that have collected on the electrode surfaces. As it rises, the pusher gas is confined between the vertical electrode members 26 and 28.

A perforated manifold portion 65 of the line 64 through which the pusher gas is released into the chamber 24 is arranged horizontally along the bottom of the chamber to complement the action of the circulating electrolyte released through the circulation manifold 56. It has a U-shaped configuration oppositely oriented with respect to the circulation manifold 56, so that the two manifolds 56 and 65 are internested in a rectangular format as shown in FIG. 3.

The pusher gas should be a gas that would otherwise be introduced through the carburetor 12 and, therefore, will not affect the combustion process apart from the presence of the hydrogen and oxygen yielded by the electrolysis chamber 24. This gas can be ambient air. It is preferred, however, as shown in FIG. 1, to use a portion of the engine exhaust diverted from the exhaust system 16 via a tube 66. The gas includes a large component of unburned hydrocarbons that must be recycled to control pollution. The hydrogen supplementation system then serves a dual function by recycling the exhaust gases and by assuring that these exhaust gases, that commonly contribute to poor engine performance, are thoroughly mixed with the hydrogen and oxygen so that they are burned as fully and completely as possible.

The electric power that must be applied to the electrodes 33 and 34 is derived from the alternator 18, driven by the engine itself, and from the battery 20 in the event that sufficient power is not available from the alternator. The voltage from the alternator 18 and the battery 20 is modulated by a variable resistor 70 or other voltage attenuation device mechanically operated by the throttle 22 (FIG. 1). Accordingly, the rate at which hydrogen is generated in the electrolysis chamber 24 is controlled by modulating the plate potential in accordance with the instantaneous power demands made upon the engine by manually adjusting the position of the throttle 22.

As the current passes from the variable resistor 70 to the electrodes 33 and 34, it passes through a polarizing relay 72. The purpose of this relay 72 is to reverse the polarities of the electrodes 33 and 34 each time that an ignition switch 74 is returned to the "on" position. This periodic reversal of polarity prevents the buildup of solid deposits on the electrode surfaces and reduces any tendency of those surfaces to be damaged chemically by the electrolysis process. The ignition switch 74 actually includes two switches. A manually operated switch 76, which has a low current carrying capacity, in turn controls a solenoid operated switch 78 through which the larger current to the electrolysis chamber 24 flows.

The hydrogen and oxygen that rise to the top of the electrolysis chamber 24, along with the pusher gas from the pump 62, is collected by a hood 79 that forms the top of the chamber as shown in FIGS. 2 and 4. The gas then exits at one side of the hood 79 through a conduit 80 to the carburetor 12. At the carburetor 12 the gases from the electrolysis chamber 24 are introduced directly to the center of an air cleaner 82 above an intake 84 of the carburetor itself, as shown in FIG. 5.

Passing these gases through the carburetor 12 insures thorough mixing with the new gasoline, supplied by a gas line 86, and any ambient air which is drawn in to supplement the gas from the electrolysis chamber 24. In the event that the fuel delivery system of the engine is by fuel injection instead of carburation, the conduit 80 from the electrolysis chamber 24 is simply positioned adjacent to the air intake of the injection system (not shown).

This arrangement also permits escape into the atmosphere of any hydrogen and oxygen that is not drawn into the carburetor or other fuel delivery system as the result of low engine demand at the time the hydrogen and oxygen is produced. It is thus an advantage of the invention that no hydrogen or oxygen is ever stored in the system. Hydrogen is produced on demand and if not used it is immediately dissipated. The quantity of gases dissipated is minimized because gases cannot accumulate in the electrolysis chamber 24 in substantial quantities.

Because the demands of the engine for hydrocarbon fuel are significantly reduced when the hydrogen supplementation system is in operation, a manually adjustable fuel restrictor valve 88 is inserted in the gasoline line 86. However, this restrictor 88 is bypassed when the hydrogen supplementation system is not in use by allowing the gasoline to flow through an electrically controlled valve 90. When the hydrogen supplementation system is activiated by closing a switch 92, the valve 90 is turned to a position in which it blocks the flow of any gasoline that would bypass the restrictor 88.

It will be appreciated that the invention provides for a substantial improvement in the performance of an internal combustion engine with relatively little change or modification to the engine itself. In fact, the system requires little or no modification of the engine and it can be easily added to existing engines. The system can be removed from one engine and installed on another and the engine can be readily returned to its original condition. It has been found to very significantly increase the power and economy of the engine, also causing it to run more smoothly, and it greatly decreases the emission of pollutants.

While a particular form of the invention has been illustrated and described, it will be apparent that various modifications can be made without departing from the spirit and scope of the invention.

We claim:

1. In a combustion engine including at least one combustion chamber, a hydrocarbon fuel tank, fuel delivery means for mixing said fuel with air and delivering said fuel/air mixture to said combustion chamber, throttle means for adjustably controlling said fuel delivery means, and a source of electrical potential energized by the operation of said engine, the improvement to said engine comprising:

a reservoir containing an electrolyte that is at least part water;

an electrolysis chamber;

an electrolyte feed line leading from said reservoir to said chamber, whereby said chamber is filled with said electrolyte;

a pair of electrodes disposed within said chamber and at least partially immersed in said electrolyte, each of said electrodes including a plurality of perforated horizontal electrode plates, said electrodes being electrically connected to opposite sides of said source of electrical potential, whereby said electrolyte is broken down to yield hydrogen and oxygen;

voltage means for varying the electrical potential applied to said electrode plates in response to adjustment of said throttle means thereby producing hydrogen and oxygen at a rate responsive to the adjustment of said throttle means;

fuel supplement delivery means for supplying said hydrogen and oxygen to said fuel delivery means;

pump means for blowing a pusher gas under positive pressure through a pusher gas manifold, whereby said gas rises through said chamber and sweeps said hydrogen and oxygen from said plates; and a perforated pusher gas manifold extending throughout the entire bottom of said chamber beneath said electrodes to distribute said pusher gas horizontally throughout the bottom of said chamber whereby said pusher gas instantaneously sweeps hydrogen and oxygen from said plates and prevents a hazardous and unsafe accumulation of hydrogen and oxygen within said chamber.

2. The apparatus of claim 1 wherein the plates of said electrodes are interleaved.

3. The apparatus of claim 2 wherein said perforations of alternate ones of said plates are non-aligned to promote lateral movement of said pusher gas.

4. The apparatus of claim 3 wherein successive ones of said plates are vertically separated by non-conductive spacers.

5. The apparatus of claim 4 wherein said spacers are elongated glass strips.

6. The apparatus of claim 1 further comprising circulation means for causing said electrolyte to circulate through said electrolysis chamber, thereby enhancing the movement of hydrogen and oxygen away from said plates.

7. The apparatus of claim 6 wherein said circulation means includes a pump.

8. The apparatus of claim 1 further comprising circulation means for causing said electrolyte to circulate through said electrolysis chamber, said circulation means comprising a pump and a filter arranged in series.

9. The apparatus of claim 1 wherein said fuel delivery means of said engine has an air/fuel intake, said fuel supplement delivery means supplying said hydrogen and oxygen from said electrolysis chamber to said intake and any hydrogen and oxygen not drawn into said fuel delivery means being allowed to escape into the atmosphere.

10. The apparatus of claim 1 further comprising:

valve means for selectively permitting said electrolyte to flow from said reservoir into said electrolysis chamber; and sensor means for sensing the level of said electrolyte in said electrolysis chamber and for causing said valve means to admit additional electrolyte to said chamber in response to a reduction in said level.

11. The apparatus of claim 10 wherein said sensor means comprises a pressure responsive switch.

12. In a combustion engine, including at least one combustion chamber, a hydrocarbon fuel tank, fuel delivery means for mixing said fuel with air and delivering said fuel/air mixture to said combustion chamber, throttle means for adjustably controlling said fuel delivery means, a source of electrical potential energized by the operation of said engine and an exhaust system for removing exhaust gases from said engine, the improvement to said engine comprising:

a reservoir containing an electrolyte that is at least part water;

an electrolysis chamber;

an electrolyte feed line leading from said reservoir to said chamber whereby said chamber is filled with electrolyte;

a pair of electrodes disposed within said chamber and at least partially immersed in said electrolyte, said electrodes being electrically connected to opposite sides of said source of electrical potential, whereby said electrolyte is broken down to yield hydrogen and oxygen;

fuel supplement delivery means for supplying said hydrogen and oxygen to said fuel delivery means;

return pump means for recirculating a portion of said exhaust gas from said exhaust system; and means for supplying said portion of said exhaust gases from said return pump means to said electrolysis chamber beneath said electrodes as a pusher gas, whereby said pusher gas rises through said electrolyte and sweeps said hydrogen and oxygen from said electrodes.

13. The apparatus of claim 12 wherein each of said electrodes comprises a plurality of horizontal plates, the plates of said electrodes being interleaved.

14. The apparatus of claim 13 wherein each of said plates has perforations therein to allow said pusher gas to rise through said perforations.

15. The apparatus of claim 12 further comprising:

valve means for selectively permitting said electrolyte to flow from said reservoir into said electrolyte chamber; and means for sensing the level of electrolyte in said electrolysis chamber and for causing said valve means to admit additional electrolyte to said chamber in response to a reduction in said level.

16. The apparatus of claim 12 further comprising circulation means for causing said electrolyte to circulate through said electrolysis chamber, thereby promoting the movement of hydrogen and oxygen from said plates.

17. The apparatus of claim 12 further comprising circulation means for causing said electrolyte to circulate through said electrolyis chamber, said circulation means comprising a pump and a filter arranged in series.

18. The apparatus of claim 12 wherein said fuel delivery means of said engine has an air/fuel intake, said fuel supplement delivery means supplying said hydrogen and oxygen from said electrolysis chamber to said intake and any hydrogen and oxygen not drawn into said fuel delivery means being allowed to escape.

19. The apparatus of claim 12 further comprising means for varying the rate at which said electrolyte is broken down in response to the adjustment of said throttle means.

20. The apparatus of claim 12 further comprising voltage means for varying the electrical potential applied to said electrode plates in response to the adjustment of said throttle means.

21. A combustion engine including at least one combustion chamber, a hydrocarbon fuel tank, fuel delivery means for mixing said fuel with air and delivering said fuel/air mixture to said combustion chamber, and a source of electrical potential energized by the operation of said engine, the improvement to said engine comprising:

a reservoir containing a liquid electrolyte that is at least part water;

an electrolysis chamber;

an electrolyte feed line leading from said reservoir to said chamber whereby said chamber is filled with said electrolyte;

a pair of electrodes disposed within said chamber and at least partially immersed in said electrolyte, said electrodes being electrically connected to opposite sides of said source of electrical potential, whereby said electrolyte is broken down to yield hydrogen and oxygen;

fuel supplement delivery means for supplying said hydrogen and oxygen to said fuel delivery means; and circulation means for causing said liquid electrolyte to be removed from and returned to said electrolysis chamber, thereby increasing the turbulence and agitation within said chamber to instantaneously sweep hydrogen and oxygen from said electrodes and prevent a hazardous and unsafe accumulation of hydrogen and oxygen within said chamber.

22. The apparatus of claim 21 wherein each of said electrodes comprises a plurality of horizontal plates, the plates of said electrodes being interleaved.

23. The apparatus of claim 22 wherein each of said plates has perforations therein to allow said pusher gas to rise through said perforations.

24. The apparatus of claim 22 wherein said electrolyte includes lignite activited water.

25. In a combustion engine including at least one combustion chamber, a hydrocarbon fuel tank, fuel delivery means for mixing said fuel with air and delivering said fuel/air mixture to said combustion chamber, throttle means for adjustably controlling said fuel delivery means, and a source of electrical potential energized by the operation of said engine, the improvement to said engine comprising:

a reservoir containing an electrolyte that is at least part water;

an electrolysis chamber;

an electrolyte feed line leading from said reservoir to said chamber, whereby said chamber is filled with said electrolyte;

a pair of electrodes disposed within said chamber and at least partially immersed in said electrolyte, each of said electrodes including a plurality of perforated horizontal electrode plates, said electrodes being electrically connected to opposite sides of said source of electrical potential, whereby said electrolyte is broken down to yield hydrogen and oxygen;

voltage means for varying the electrical potential applied to said electrode plates in response to adjustment of said throttle means thereby producing hydrogen and oxygen at a rate responsive to the adjustment of said throttle means;

fuel supplement delivery means for supplying said hydrogen and oxygen to said fuel delivery means;

pump means for blowing a pusher gas under positive pressure through a pusher gas manifold, whereby said gas rises through said chamber and sweeps said hydrogen and oxygen from said plates;

a perforated pusher gas manifold extending throughout the entire bottom of said chamber beneath said electrodes to distribute said pusher gas horizontally throughout the bottom of said chamber whereby said pusher gas instantaneously sweeps hydrogen and oxygen from said plates and prevents a hazardous and unsafe accumulation of hydrogen and oxygen within said chamber; and circulating means for causing said electrolyte to circulate throughout said chamber, thereby enhancing the movement of hydrogen and oxygen from each of said plates simultaneously.

* * * * *